Sept. 24, 1974     R. W. ERWIN     3,837,956
PREPARATION OF PLASTIC-METAL PRODUCTS INCLUDING
LAMINATES, COMPOSITE TUBES AND THE LIKE
Original Filed May 28, 1970

United States Patent Office 3,837,956
Patented Sept. 24, 1974

3,837,956
PREPARATION OF PLASTIC-METAL PRODUCTS INCLUDING LAMINATES, COMPOSITE TUBES AND THE LIKE
Ransome W. Erwin, Houston, Tex., assignor to Austral-Erwin Engineering Co., Houston, Tex.
Original application May 28, 1970, Ser. No. 41,375, now abandoned. Divided and this application Apr. 21, 1972, Ser. No. 246,220
Int. Cl. B29d 23/10
U.S. Cl. 156—218          17 Claims

ABSTRACT OF THE DISCLOSURE

This invention relates to the provision of novel and economical ways of: (1) Heat bonding, solely with heat, plastics, particularly the fluorocarbon polymers and specifically the polymer hexafluoropropylenetetrafluoroethylene manufactured exclusively by E. I. du Pont de Nemours & Company and sold under the trade name of FEP, to metal surfaces, particularly flexible metal sheets and plates. (2) Heat bonding or adhesive cement bonding these same metal sheet-plastic laminates to other metal surfaces, particularly those of pipes and vessels. (3) Fabrication of composite tubes or sleeves, solely by heat bonding of seams of these composite sheets shaped into tubes or sleeves, said tubes or sleeves being useful alone as conduits for fluids or which may be heat or adhesive cement bonded to other metal pipes and vessels, as protective coats and liners, and method and means for installing said liners.

This is a division of application Ser. No. 41,375, filed May 28, 1970 now abandoned.

PHASE A—IMPROVEMENTS IN COATING METAL SURFACES WITH PLASTIC FILMS AND ARTICLES MADE FROM SAME

Broadly speaking this phase of the invention relates to improvements in method and apparatus for coating metal surfaces with plastic films and to articles made therefrom.

Current and Past Practices: The use of plastics for coating metal surfaces for protection against corrosion and abrasion, for lubricity, for minimizing depositions, and for making surfaces preferentially oil wettable is known and practiced. For this purpose use has been made of fluoronated polymeric plastic materials such as Teflon, FEP and the like. Teflon and FEP are trade names of the E. I. du Pont de Nemours & Co., respectively, for (1) a plastic consisting of a tetrafluoroethylene polymer, and (2) a plastic consisting of a hexafluoropropylenetetrafluoroethylene polymer. Du Pont provides to industry three types of FEP called A, C and C–20. As described in their Teflon bulletins, Teflon FEP A is a general purpose grade, used for heat sealing to itself or for heat bonding to other materials. Teflon FEP type C has only one surface modified to permit cementing it to other materials using commercially available adhesives. Teflon FEP type C–20 has both surfaces cementable. Ryan Pat. No. 3,030,290 assigned to E. I. du Pont de Nemours & Co. describes a method of making these perfluorocarbon polymers or resin surfaces cementable by use of an electrical corona discharge. So far as known to the present inventor based on a search of the prior art relating to Teflon type coating and to investigation of the available technical literature the following are the principal types of processes along these lines.

(A) The metal surface is first thoroughly cleaned by sand blasting, chemical etching, or by use of chemical solvents, either separately or in combination; followed by spraying, wiping or brushing on a finely divided Teflon type material usually suspended in distilled water, and heating until the particles fuse into a film-like coating, repeating the procedure if desired to add more coats as thickness is desired, then finally baking to anneal all coats and firmly bond to metal. This method is the one most frequently used on pipes and vessels with curved surfaces.

(B) On flat surfaces the procedure described in (A) may be employed followed by compressing with suitable pressure means, first adding a perfluorocarbon polymer film to the deposited coat and then mashing and heating.

(C) For use on either curved or flat surfaces, the metal surface is first prepared as described in (A), using a suitable adhesive cement to bond a film that has a specially prepared cementable surface, the film being preferably a perfluorocarbon polymer such as FEP and the surface being generally referred to as an "etched" surface. There are several patents in the art of "etching" or rendering fluorocarbon film surfaces cementable, one being the Ryan Pat. No. 3,030,290 previously noted. The cemented film is heated to the setting or bonding temperature of the particular adhesive employed, generally somewhat less than the melting temperature of the fluorocarbon polymer film. The film may be cement bonded to flat surfaces by use of rolls or by simply applying the film to the surface and heating. It is generally recognized by those skilled in the art that plastic film is difficult to bond to curved interiors of pipe and vessels. In all these discussions the use of the word "film" will be understood to mean a fluoronated or perfluoronated hydrocarbon polymer or du Pont Teflon or FEP. Use of mandrels, inflated bags, and the difference in temperature expansion of Teflon like materials and metal to obtain a compressing contact of the film to the concave curved surface is a common practice, in conjunction with adhesive cement. Where no adhesive cement is used, films bonded by these means have not in general proved commercially successful on concave surfaces. The process itself is expensive and limited to short lengths of pipe. Even cement bonding the film to both flat and curved surfaces is relatively expensive and prohibitively so for many applications, because of the involved preparations of surface required and the precision required in handling very thin films. On small pipe such as 1" and ¾" which are commonly used for the miles of tubing in heat exchangers in sea-water distillation plants, no known means has been advanced for lining with thin fluorocarbon films at a cost compatible with the economy demanded for such installations either with the coating being applied as a film or by the use of dispersed particles baked on.

Other current practices, not involving plastic coated metals, but closely related to the heat exchanger tube problem, involve the use of tubes made wholly of the fluorocarbon resinous material. Du Pont offers a bundle arrangement using numerous small comparatively thick walled tubes, two listed sizes being 0.250" O.D. x 0.200" I.D. and 0.100" O.D. x 0.080" I.D. In the first tube size above listed the wall thickness is 0.025" or 25 mils and in the second tube it is 0.010" or ten mils. It is believed that many more square feet of surface are required over metal to offset the poorer heat transfer of the fluorocarbon polymer, the advantage being that it is absolutely corrosion proof and less subject to fouling or scaling. These thicker tube walls are required in order to provide reasonable working pressures, since the fluorocarbon polymer softens greatly upon heating and loses a substantial part of its tensile strength from 100 degrees F. upward. Since the fluorocarbon resinous material is relatively expensive as compared to metals, even corrosion resisting alloys, often costing six to ten times as much, these relatively thick walled tubes, compared with tubes with only one or two mil coats of FEP on the inside and outside of metal tubes, are too costly for general seawater distillation use. Other manufacturers use "limp" tubes made wholly of fluorocarbons, and having thin wall FEP generally from about one to two mils thick. They have the same problem, of limited working pressure and must resort to involved means to support the tubes or keep them from entangling and giving mechanical problems.

Cost analysis of tubes and coatings: The approximate price of a 2 or 3 mil baked-on Teflon coating on a ¾" tube is about ninety cents per linear foot for inside only and about one dollar per linear foot for outside only. Cost for both is about $1.80/linear foot. This would amount to about $11.25 per square foot of tube area. This baked-on coating is admittedly porous and will not prevent corrosion, so a corrosion resistant tube such as a 90–10 copper nickel should be used. This tube in large quantities costs about 47 cents per linear foot. To have a Teflon coated 90–10 copper nickel tube, the cost would be about $2.27 per linear foot of ¾" tube, or $13.40 per square foot. Since even 47 cents per linear foot for copper-nickel ¾" tube is practically prohibitive for seawater conversion distillation plants to produce water in competition with most other sources since the tubes in a plant amount to nearly half the total plant cost, increasing this cost five fold would be commercially prohibitive despite the advantages of Teflon coating. Heat exchangers made wholly of Teflon in the tubes, using 0.10" O.D. tubes with 0.01" wall thickness cost approximately $3.80/square foot for the tubes only, to which must be added cost of fabrication into a bundle. This is considerably cheaper than Teflon coated Cu-Ni tubes, but appreciably more than plain Cu-Ni tubes at $2.76/square foot. Since even Cu-Ni tubes are almost prohibitive to use, thus far, pure Teflon tubes costing still more per square foot would be prohibitive for sea-water distillation plants despite non-corrosion and non-fouling aspects. Thus, it would appear on the basis of the available prior art that chemical treatment of the water to prevent fouling is more economical when all aspects are considered. Until now, no one has come forth with a suitable heat exchanger tube or arrangement that will permit corrosion proof, non-fouling operation at a cost less than that of Cu-Ni tubes used with scale prevention chemical treatment. This is essential if economical, competitive conversion of seawater and brackish waters to fresh water is to be achieved. It is believed that the methods and apparatus offered in this disclosure and in my companion patent application Ser. No. 306,183, filed Nov. 14, 1972 provide a solution to the problem of cost reduction. These cost figures will be used later in this application for comparison figures.

With the foregoing disadvantages of the prior art in mind some of the principal objects of the present invention will now be set forth.

OBJECTS OF INVENTION

(A) Bonding plastic film to metal surfaces (1) An important object of this invention is to provide relatively inexpensive methods of bonding both oxidizable and inert metal surfaces, particularly sheet metal, to a plastic fluorocarbon film without application of pressure to the film by outside compression means or the use of bonding additives together with heat. Heretofore the most suitable, and possibly the only, fluorocarbon film for this use is hexafluoropropylenetetrafluoroethylene polymer manufactured solely by E. I. du Pont de Nemours & Co. and sold under the trade name of FEP. FEP is a heat bondable fluorocarbon with the inertness and resistance to corrosion of the Teflon family of fluorocarbons, with the same preferentially oil-wettability and non-adhesiveness to many other adhesive type materials. It is offered in film with a thickness ranging from 0.005" to 0.02" and widths up to about 48".

(2) A further object is the provision of a method and means for bonding plastic particularly fluorocarbon polymer films to the surfaces of metals which are subject to oxidation at the required bonding temperatures in the presence of oxygen, this being accomplished in a near perfect vacuum environment. Iron, many of its alloys, copper and many of its alloys are some commonly used metals that are vulnerable to such oxidation. Aluminum is not oxidizable within the bonding temperature ranges of FEP.

(3) A still further object is provision of a method and means, using a nearly perfect vacuum environment, of bonding fluorocarbon or other plastic film to metal surfaces with substantially perfect bonding contact without entrapment of air or other gases between the film and the metal surface, as said gases cause weakening blisters vulnerable to tearing and also tend to reduce the heat transferability of film coated metal.

(B) Fabrication of tubing and sleeves from composite plastic-metal sheets; and more particularly fluorocarbon polymer-metal laminates (1) Another important object of the invention is the provision of a composite tubular article, and improved means and method of making same from the fluorocarbon plastic-metal sheet laminate just described.

(2) A further object is the provision of a composite tube or tubular article and means and method of making the same with a complete range of coating combinations including: (a) fluorocarbon film on the inside of tube only (b) fluorocarbon film on the outside of tube only (c) and fluorocarbon film on both the inside and outside of the tube, the composite tube being composed of metal and fluorocarbon film only.

(3) A further object is the provision of a tube and method and means for making same, said tube not having been offered to industry before, being composed of metal ranging from a minimum of about 0.001" thickness upward, having a fluorocarbon film coating on either or both surfaces thereof ranging in thickness from a minimum of about 0.0005" to about 0.02".

(4) Another object of this invention is the provision of a composite tube and means and method for making same from any one of a variety of flexible metals and a fluorocarbin film. The metal employed is selected to resist chemical corrosion in the environment of its use, and, if desired, the fluorocarbon film may be applied in sufficient layers or thicknesses to resist permeation from fluids in contact with it under given temperature and pressure operation conditions.

(5) Another object is the provision of a method and means of pre-conditioning a fluorocarbon-metal laminate to prevent bonding or sticking to dies and mandrels when shaping and heat bonding into a tubular article, without impairment of the bonding of the tube seam.

(6) Another object is the provision of a method of forming a composite tubular article from a fluorocarbon-metal laminate strip wherein *the sole bonding agent is a previously bonded layer* of fluorocarbon film on each contacting seam surface, wherein the tube may be spirally formed from the strip or from a longitudinal overlap seam configuration of the laminated strip.

(7) Another object of the invention is to provide, when forming a tube or sleeve or any overlap seam bond of fluorocarbon-metal laminate strip slit from a sheet of this laminate and possessing raw, exposed metal edges between the two coverings of fluorocarbon film, an effective means and method for sealing off the exposed metal edge with fluorocarbon film.

(8) Another object of this invention is to provide a means and method of rendering a tube, sleeve or sheet composed of a laminate of previously bonded fluorocarbon film to a metal sheet, cementable to other surfaces such as the interior and exteriors of pipes or vessels, and as a heat exchanger tube being bonded to the hole in a tube sheet.

(C) Coating metal surfaces with a plastic-metal laminate particularly a fluorocarbon-metal laminate (1) The provision of a means and method of bonding a metal surface which may be flat, concave or convex with a fluorocarbon, using heat and pressure only; using adhesive cement and pressure only; using cement, heat and pressure only, where the fluorocarbon is part of a laminate of *previously* bonded fluorocarbon film and metal sheet.

(2) The provision of an improved and less expensive method of making metal surfaces, and particularly the surfaces of pipes and vessels, less vulnerable to corrosive attack and fouling with foreign depositions than any now available, this being accomplished by bonding the same to a previously bonded laminate of metal sheet with one or more layers of plastic particularly fluorocarbon polymer film bonded on each side of said metal sheet, with sufficient layers or thickness of fluorocarbon polymer to be substantially impervious to corrosive fluids, all seams of the laminate being adequately sealed with the fluorocarbon.

(3) The provision of a composite tube or sleeve, fabricated from a laminate of previously bonded fluorocarbon to flexible metal sheet, wherein the metal sheet core gives the composite articles sufficient stiffness or rigidity to permit retention of pre-shaping, such as fluting, to render it more adaptable to bonding to a pipe or vessel, while still sufficiently pliable to conform to the adjacent surface when subjected to pressure just prior to bonding. This permits complete application of cementing agent, if desired, and complete removal of air between laminate and surface to be covered, thereby avoiding mechanical fouling so common with application of limp liners. This arrangement still permits use of comparatively thin layers of expensive fluorocarbon without the difficulties inherent to handling such layers when applied alone.

(4) The provision of a method of bonding a previously bonded laminate of fluorocarbon and metal sheet, to the wall of a pipe or vessel, without entrapment of air, interior or exterior, where both surface of the laminated tube or sleeve are subjected to vacuum for removal of the air. After removal of air the edge or ends of the sleeve are then pressed into firm contact with the pipe or vessel wall, air is then admitted to the interior side only, of the laminated sleeve, thus providing approximately one atmosphere of pressure to firmly and uniformly press the sleeve against the wall of the pipe or vessel. More air pressure may be supplied if conditions warrant, together with heating to bond the laminated sleeve to the vessel wall.

(5) The provision of a fluted configuration of the laminated sleeve in (4) to permit minimum contact of sleeve with pipe or vessel surface facilitating removal of air, and providing uniform conformation of the sleeve to the pipe or vessel wall when pressure is applied to it. Further, where a bonding cement is to be used, to permit uniform contact of the cementing material with both laminated sleeve and the pipe or vessel wall.

(6) The provision where a laminated sleeve of fluorocarbon film and metal is to be cement bonded to the surface of a pipe or vessel, of a method of circulating a thinned liquid form of the cement or dispersion of it in a gas such as air through the annular space between the laminated sleeve and pipe or vessel wall and a method for subsequent removal of cement solvent by circulation of air or gas, then proceeding as in (4).

My invention may be considered under the following headings:

Phase A: The preparation of metal-plastic laminates, and more particularly fluorocarbon-metal laminates.

Phase B: The preparation of improved composite tubes from laminates, particularly those produced under Phase A.

Phase C: Method and means for coating metal surfaces with a previously bonded plastic film and metal sheet.

These will be considered in order.

The invention will be more readily understood by reference to the accompanying drawings, largely diagrammatic in character, illustrative of the improved product and method and means for producing the same.

Figure 11:
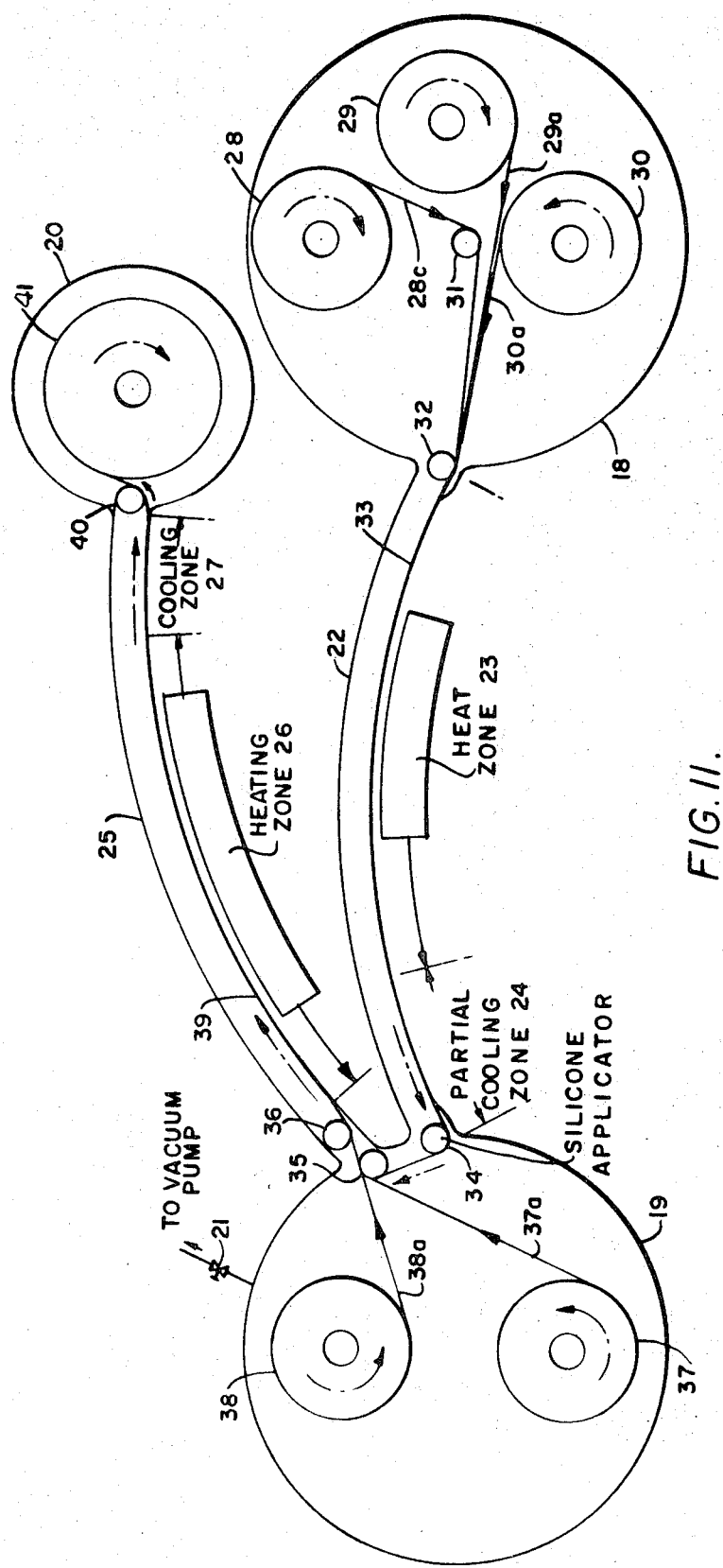
Figure 12A:
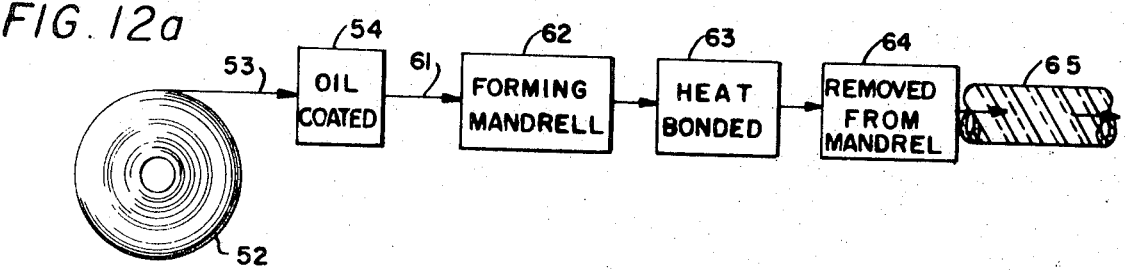
Figure 12B:
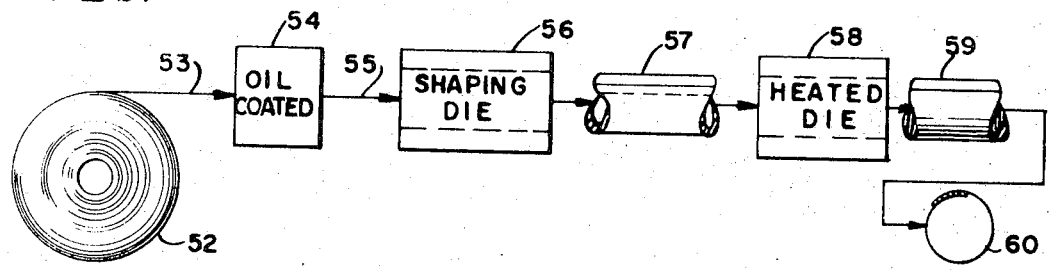
Figure 13:
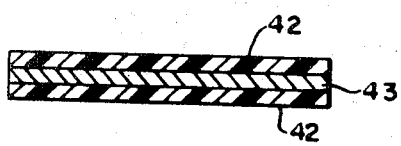
Figure 15:
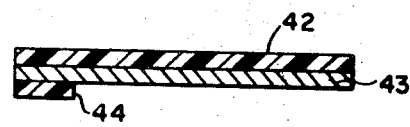
Figure 14:
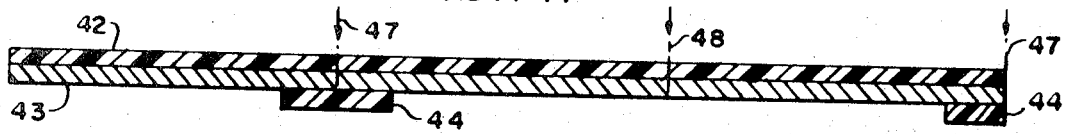
Figure 16:
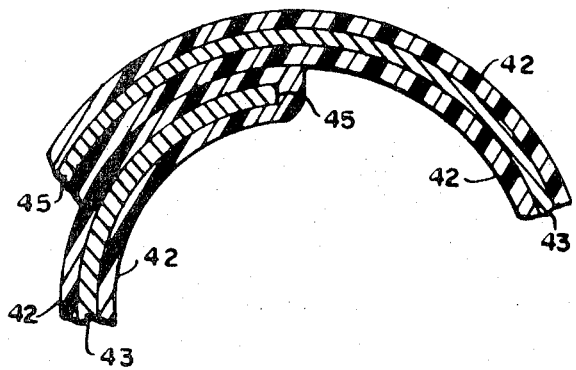
Figure 17:
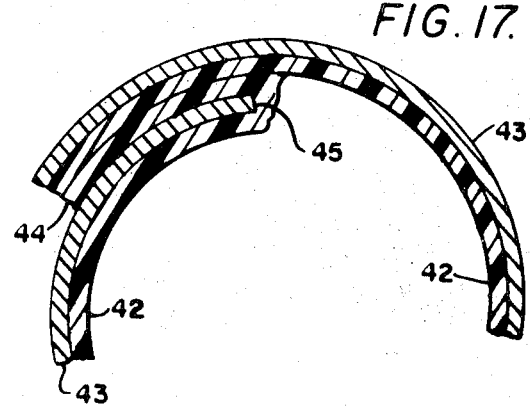
Figure 18:
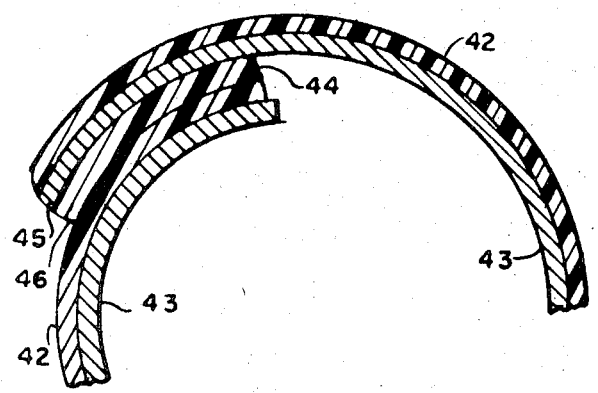
Figure 20:
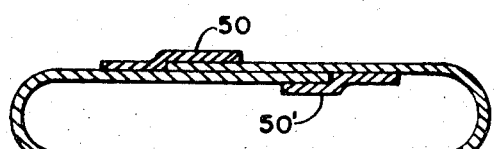
Figure 19:
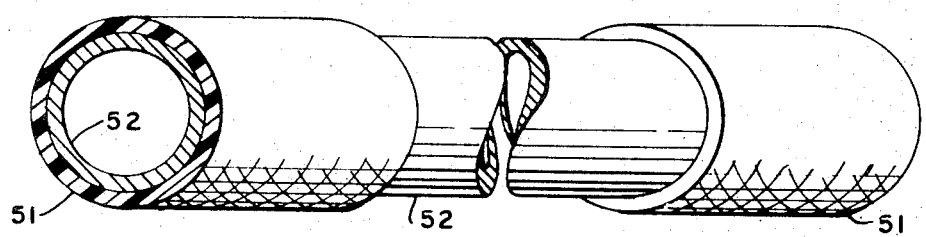
Figure 21:
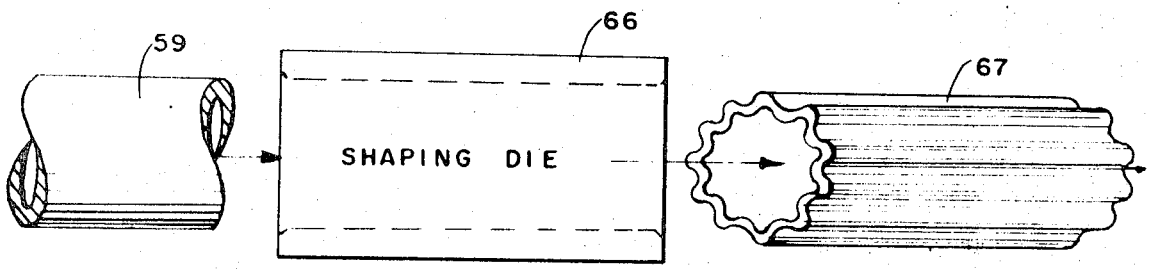
Figure 22:
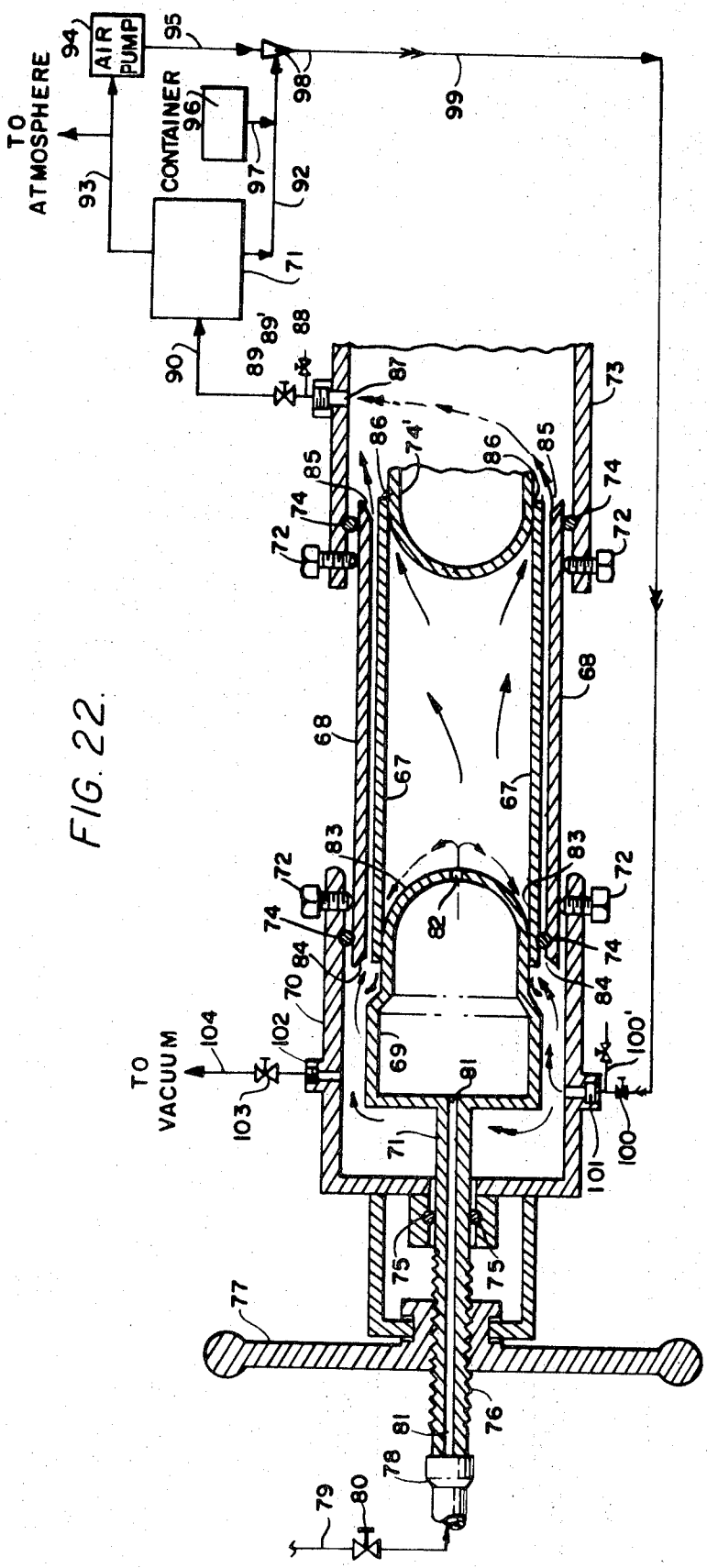
Figure 23:
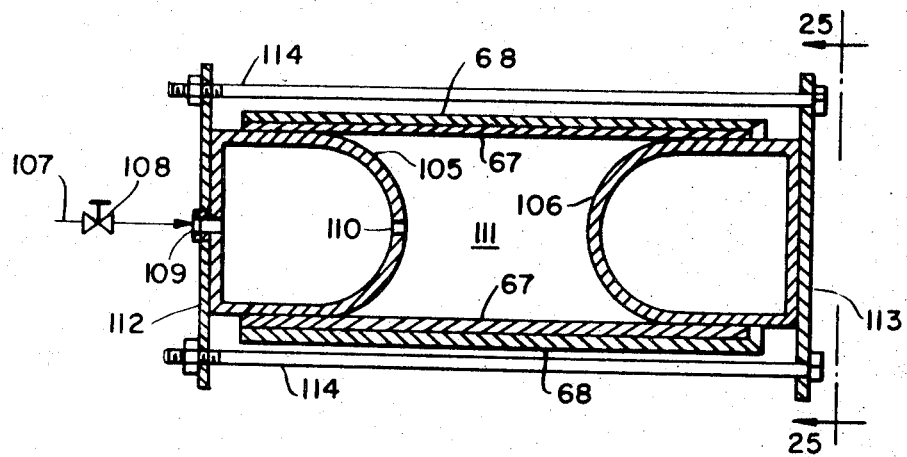
Figure 24:
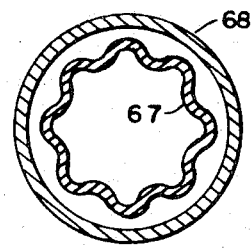
Figure 25:
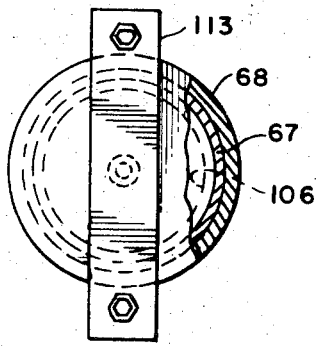

FIG. 11 is a diagrammatic view showing an apparatus for bonding one or more layers of plastic film to each surface of a flexible metal strip, said apparatus including three fluid-tight vessels or containers connected by elongated heating conduits, the whole system being subjected to a suitable degree of vacuum, means being provided for passing the metal strip successively from a first vessel through a first conduit to a second vessel and thence through a second conduit to a third vessel, plastic film being adapted to be supplied to opposite surfaces of the metal film in continuous operation and bonded thereto by heating under subatmospheric conditions;

FIGS. 12a and 12b are further schematic views of apparatus showing alternate means for converting a plastic clad metal strip or laminate into a finished bonded tubular article without employing any bonding adhesive other than the plastic coating itself;

FIG. 13 is a longitudinal section of a three-ply plastic-metal laminate which may be converted into a composite tubular article by one of the means shown in FIGS. 12a and 12b;

FIGS. 14 and 15 are longitudinal sectional views of another form of laminate including spaced strips, which may be converted into a plastic tube by one of the means shown in FIGS. 12a and 12b;

FIG. 16 is a fragmentary cross sectional view of one of the overlapping seam portions of the three-ply tube undergoing bonding treatment;

FIG. 17 is a view similar to FIG. 16 but showing a composite two-ply tube comprising a plastic metal laminate with the seam exposed for bonding as in FIG. 16;

FIG. 18 is a view similar to FIG. 17 but showing a modification;

FIG. 19 is a perspective view partly broken away with one end and an intermediate portion shown in transverse section, of a composite tube produced in accordance with the present invention;

FIG. 20 is a transverse sectional view of a flattened tube produced in accordance with my invention;

FIG. 21 is a diagrammatic view showing a schematic arrangement for pulling a pliable composite tube of plastic clad metal tubing circular in cross section through a shaping die to form a fluted tube;

FIGS. 22 and 23 are longitudinal sectional views with parts illustrated diagrammatically of an apparatus for bonding a fluted coated tube such as is shown in FIG. 21 to the interior of a cylindrical outer pipe or vessel;

FIG. 24 is a cross sectional view of the cylindrical vessel of FIGS. 22 and 23 with the fluted sleeve shown therein but not yet bonded; and FIG. 25 is an end view partly in section of one end of FIG. 23 taken on line 25—25 thereof.

Description of Invention

PHASE A—THE PREPARATION OF IMPROVED METAL-PLASTIC LAMINATES

This phase of the invention is illustrated primarily by FIGS. 1–11, inclusive, which illustrate the preparation of metal-plastic laminates including the method, apparatus for carrying out the method, and the improved article. The preferred method relates to adhering a film of plastic material to a metal surface and includes the steps of superposing a first lamina or layer of plastic film upon a surface of a second lamina or layer formed of thin metal and subjecting the laminae to reduced atmospheric pressure conditions to remove any air from between the laminae and applying sufficient heat to soften the plastic film and bond the same to the metal surface to form a bonded metal-plastic laminate. The metal surface may be flat or curved. The plastic is preferably in the form of a film of fluorocarbon polymer. The metal may be oxidizable or unoxidizable at the bonding temperature of the plastic. Where the plastic is a fluorocarbon polymer the bonding temperature should be within the approximate range of 450° F. to 625° F. The laminae to be bonded may be wrapped in coils around a shaft, tube or core and subjected to vacuum treatment while in wrapped form for the purpose of eliminating any air. One or both sides of the metal strip or lamina may be coated with plastic film. One bonded plastic side of the metal strip may be coated with silicone or the like to prevent sticking to a support backing strip when heated.

Phase A of the invention will now be more fully described by reference to FIGS. 1–11 inclusive of the drawings.

Figure 1:
FIG. 1 is a longitudinal sectional view showing an unbonded laminate of plastic film and thin metal superposed upon a flat base; and also depicts the same after bonding.

FIG. 1 shows a layer 1 of heat bondable plastic film preferably of fluorocarbon polymer, such as Du Pont FEP from 0.0005" to 0.02" thickness superimposed on a sheet of metal 2 from 0.0012" upward, both layers resting on a flat base 3. The film and metal sheet appear flat, before and after bonding with heat at 450 to 600° F. in a vacuum.

Figure 2:
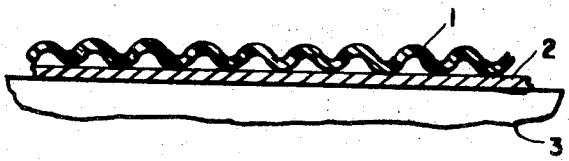
FIG. 2 is a view similar to FIG. 1 intended to illustrate the expansion and buckling of the plastic film at an intermediate stage of heating in the course of bonding the laminate.

FIG. 2 shows the film 1 and metal sheet 2 of FIG. 1 at an intermediate temperature, 300° to about 450° F., when the film is at its maximum expansion prior to shrinking and bonding to the metal surface as shown in FIG. 1. Air trapped under the folds of film 1 will cause bubbles or blisters upon shrinking and bonding of the film unless the process is performed in a vacuum.

Figure 3:
FIG. 3 is a view similar to FIG. 1 with the laminate superposed upon a convexly curved metal surface.

FIG. 3 shows a FEP film 1 superimposed on a sheet of metal 2, both in curved position over a curved base 4, the film being on the convex side of the metal sheet which is, in turn, on the convex side of the base 4. The film and the metal sheet appear this way prior to any heating and after heat bonding at a temperature of 450° to 600° F. in a vacuum.

Figure 4:
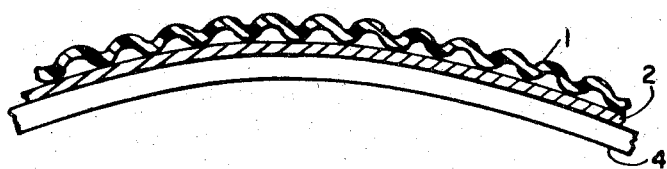
FIG. 4 is a view similar to FIG. 2 at an intermediate stage of expansion of the plastic but with the laminate superposed upon a convex surface as in FIG. 3.

FIG. 4 shows a FEP film 1 at its maximum expansion between 300 and 450° F. prior to shrinking and bonding from 450° to 600° F. as shown in FIG. 3.

Figure 5:
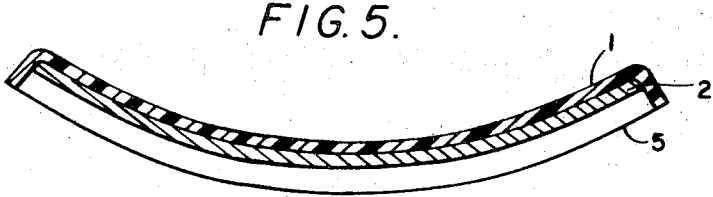
FIG. 5 is a view similar to FIG. 1 but with the unbonded laminate resting on the concave surface of a metal base.

FIG. 5 shows FEP film 1 superimposed on metal sheet 2, touching its concave side, it in turn resting on the concave side of base 5, all prior to any heating.

Figure 6:
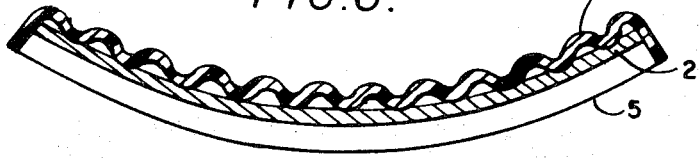
FIG. 6 is a view similar to FIG. 5 but with the plastic layer shown at its maximum expansion as in FIGS. 2 and 4.

FIG. 6 shows FEP film 1 at its maximum expansion between 300° and 450° F. prior to shrinking from 450° to 600° F.

Figure 7:
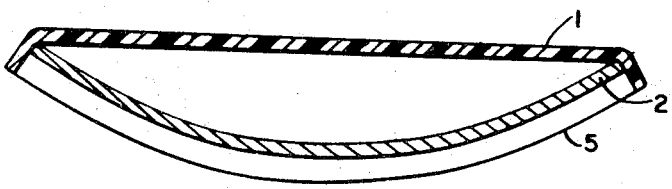
FIG. 7 is a view similar to FIG. 5 but with the plastic film shrunk and pulled away from the metal sheet.

FIG. 7 shows FEP film 1 shrunk and pulled away from metal sheet 2 as the temperature is elevated above 300° F., failing to bond to metal sheet 2.

Figure 8:
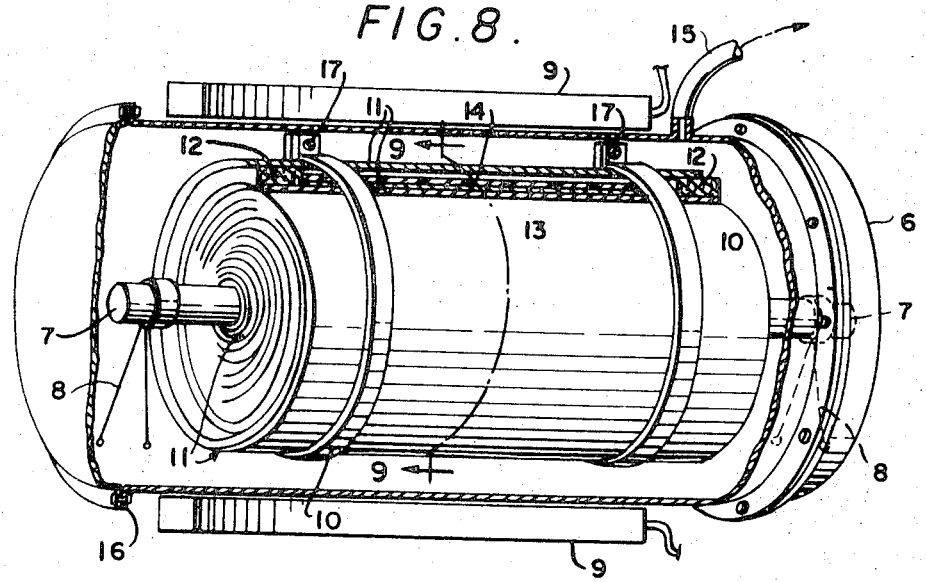
FIG. 8 is a side view partly in section of a heating vessel or container subjected to a vacuum pump or the like and having suspended therein a composite roll of plastic and metal sheets to be subjected to a heat bonding operation under subatmospheric pressure conditions.
Figure 9:
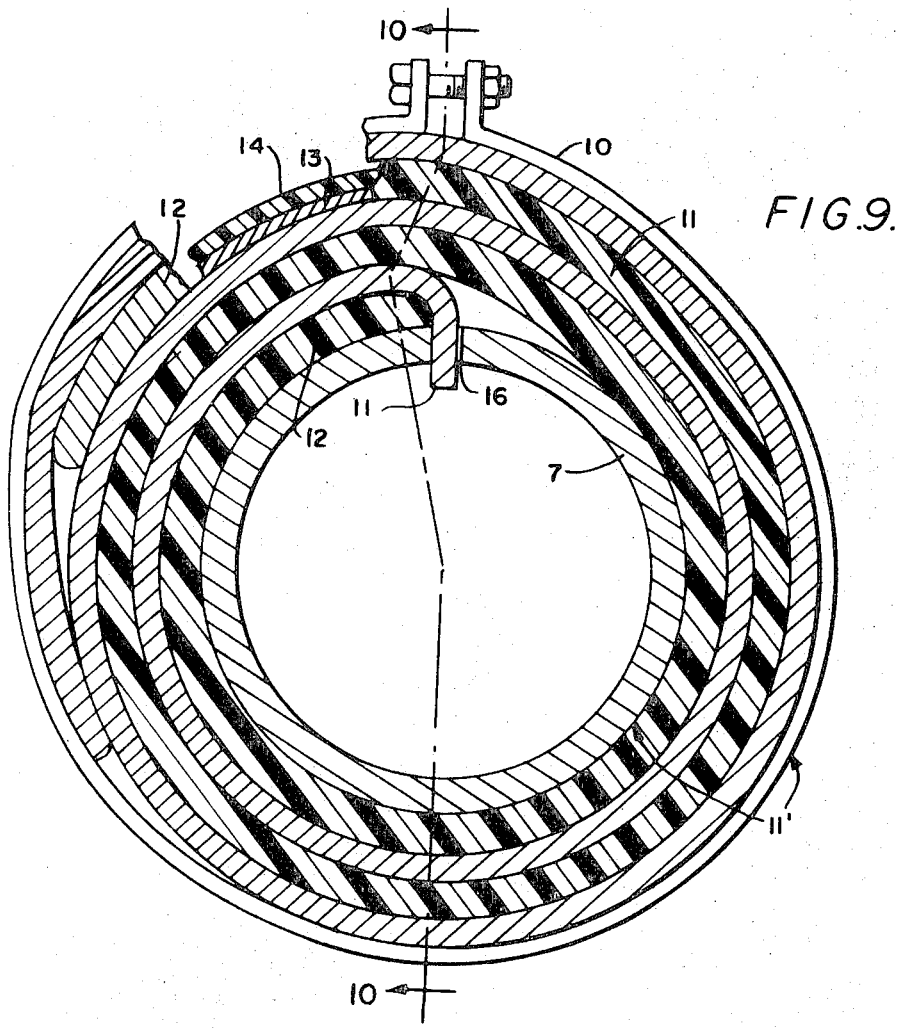
FIG. 9 is a transverse sectional view on line 9—9 through the composite roll of FIG. 8 on a larger scale than in FIG. 8 and with the core shown proportionately much larger than in FIG. 8.

FIG. 8 shows a hollow cylindrical vessel 6 from which air is removed through conduit 15 to a source of vacuum (not shown). This vessel 6 is built to permit removal of ends 6a to permit entering, by means of flanges 16. Inside 6 in a composite roll 11' having, first, a base sheet of heavier metal (about 0.01" thickness) for maintaining a true coil when very thin metal sheets are to be bonded to FEP, this heavier sheet shown by numeral 11. At each end of sheet 11 is a spacer strip 12 of flexible material, about ⅙" to ⅛" thick and 1" to 2" wide and attached to sheet 11 with slack to allow for curving over sheet 11 when coiled. These spacer strips can be made of any suitable material such as woven asbestos tape or fiber glass. Curved over 11, between spacer strip 12 is, next, a layer of thin flexible metal 13 to be bonded to a FEP film sheet. On top of metal sheet 13 in contact with it is a thin FEP sheet 14 which is to be heat bonded to the metal strip 13. Since the combined thickness of sheets 13 and 14 is only a few mils, the pace between them and the bottom side of base sheet 11 created by spacer strips 12 is ample to allow for intermediate expansion of FEP 14 when it is being brought up to bonding temperature. The composite roll 11' is held intact by pairs of curved straps 10 bolted together at flanges 17 as shown in FIG. 9. The composite roll is secured to and supported by an axially extending pipe 7 which may be moved into tank 6 by means of roller supports 8. Any of several means are employable for this purpose as the fabricator might choose. The vessel may be heated to bonding temperature of 600° F. by any of several heating means available to those skilled in the art, as indicated at 9.

FIG. 9 is a cross-section view of the composite roll 11' showing slot 16' in pipe 7 as one of several means of securing base sheet 11 to pipe 7. As in FIG. 8, 11 is the base sheet; 12 is a spacer strip; 13 is the metal sheet to be coated; 14 is the FEP film to be heat bonded to the metal sheet.

Figure 10:
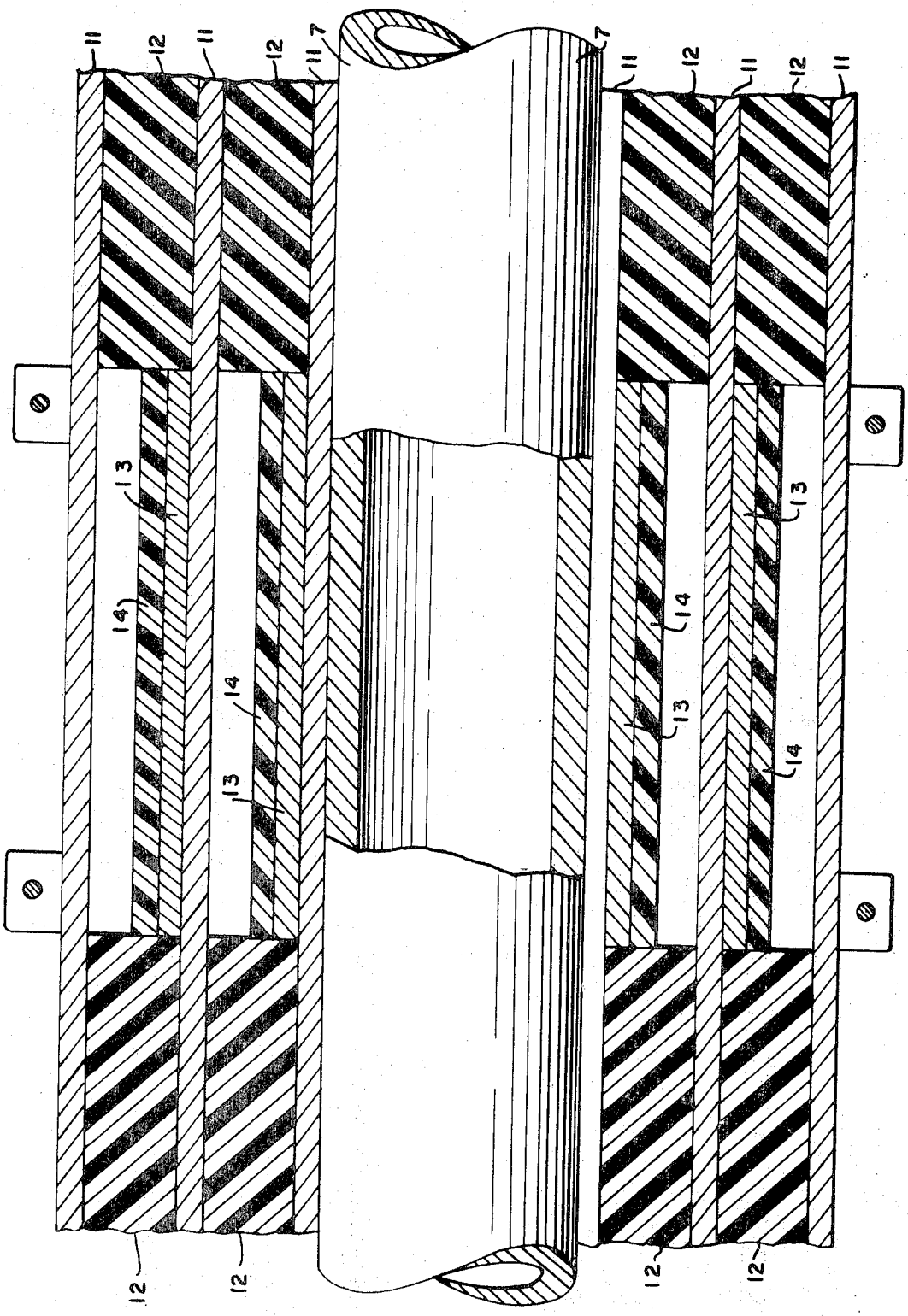
FIG. 10 is a longitudinal sectional view of the composite roll of FIG. 8 and on a larger scale taken on line 10—10 of FIG. 9 and showing the spacer strips of FIG. 8 on each end of the composite roll, the core also being shown enlarged as compared with that of FIG. 8 but of somewhat less proportional size than in FIG. 9.

FIG. 10 is a longitudinal cross-sectional view of composite roll 11' giving more detail of the arrangement of FEP 14 on top of sheet metal 13, both on top of base sheet 11, with spacer strips 12 at each end.

FIG. 11 shows a schematic arrangement of apparatus for bonding, with heat, one or more layers of FEP film to each side of a flexible metal sheet, the whole operation carried out, without a base sheet or spacer strips, and in a substantially subatmospheric pressure or vacuum environment. The term vacuum does not mean a perfect vacuum, but *sufficient* vacuum to provide substantially air free bonding of FEP film to the metal strip without use of mashing devices.

Vacuum pumps are well known in the art. Modern vacuum fore pumps may produce pressure down to about 0.001 mm. of mercury. Such extreme pressures may be unnecessary for the purpose of the present invention and the degree of vacuum to be employed in a given case may be determined by experimentation. Pressures of from 0.1 to 0.01 mm. of mercury are generally satisfactory. A higher degree of vacuum, while suitable, may be difficult to attain commercially, and a lower degree of vacuum may leave some air between the laminae.

Three containers, preferably metal vessels capable of withstanding a substantially complete vacuum, shown as 18, 19 and 20, are joined as shown by conduits 22 and 25. These conduits are of metal, sufficiently wide to accommodate maximum width rolls to be coated (about 4', sufficient depth, at least ¼", to accommodate intermediate expansion folds of the FEP film). There is, preferably, a slightly convex curve on the inside bottom of the conduits. This supports the moving metal sheet to assure convex contact of the FEP film with it, prior to bonding. A flat support would probably suffice under some circumstances, but the curved support is highly preferable. This conduit must be of sufficient strength to withstand substantially full vacuum without internal supports. Numeral 21 depicts a valved conduit leading to a source of vacuum (not shown) which imposes vacuum on the whole system. The system as shown will apply two layers of FEP film to each side of a flexible metal strip. The metal strip 30a from strip source shown as roll 30 in container 18 is pulled into conduit 22 underneath support roller 32 which forces it onto the curved bottom 33 of conduit 22. FEP films 28a and 29a are superimposed upon the metal sheet from rolls 28 and 29 in container 18 and are held to the metal sheet by rollers 31 and 32. The unbonded layer of metal 30a and two layers of FEP film 28a and 29a move through heat zone 23 (heated by any of several well known means) where sufficient heating is effected to bond the FEP to the metal (500° to 600° F.). It should be stated here that most rolls of flexible metal should be washed grease and dust free, with any of several well known solvents, prior to placing in container 18 as is well known to those skilled in the art. This is all the preparation needed to insure a good heat bond of the FEP to the metal.

Continuing, the metal sheet 30a with the two layers 28a and 29a of FEP bonded to it on the top surface moves through partial cooling zone 24 (with certain types of fluorocarbons this cooling step may be omitted). The metal strip 30a with the two layers of bonded FEP on one side passes over guide roller 34 which also functions as a silicone applicator for coating the bonded FEP surface with silicone or the like to prevent subsequent sticking to the curved bottom 39 of the next heating zone 26 in conduit 25. The details of the silicone applicator-roller 34 are not shown as this is a common appliance known to anyone skilled in the art. It should be stated that it might require a hollow shaft, with a packing, extending outside to permit replenishing the supply of silicone oil or the like in the roller which must be perforated to supply the silicone to the FEP surface contacting it. The silicone applicator roller 34 also serves to help confine the moving strip of metal and FEP to the curved bottom 33 of conduit 22, and to direct it to the upper roller 35. Rolls 37 and 38 in container 19 supply the second two layers 37a and 38a of FEP film which are superimposed on the uncoated upper surface of the metal strip 30a at roller 35. Roller 36 functions to hold the metal sheet, with its two bonded layers 28a and 29a of FEP on the underside now coated with a film of silicone oil or the like and its two new layers 37a and 38a of unbonded FEP on the top side, to the convex side of curved bottom 39 of conduit 25. The metal strip 30a and the four FEP layers pass through heating zone 26 where the two unbonded layers on top become firmly bonded to the top surface of the metal strip, the silicone coating on the bottom of the composite strip preventing sticking of the already bonded FEP to the hot curved base 39. The metal strip 30a with its two bonded layers of FEP on each side is passed through cooling zone 27, then under guide roller 40 which serves to confine the composite strip to the bottom 39 and also to direct the finished strip onto roll 41 in container 20. If the composite metal-FEP strip is to be used as lining material to be cemented to the surface of a pipe or vessel (interior or exterior), the last layer of FEP to be added (from roll 38) should be type C FEP with the etched side up, so that the finished composite sheet will have one side with etched FEP exposed for cementing purposes. One sheet or layer of FEP film can be applied with this set-up, or several as desired, adding more rolls of film to the containers as needed. Since this would be evident to one skilled in the art, it is not shown. The reason for using several layers, for example two layers of 0.001" FEP film instead of one layer of 0.002" which would give the same thickness, is to avoid the hazard of pin holes which will often exist in the film. It is not likely that two pinholes would coincide in two layers of film, whereas a single thicker layer might have pinholes. It was found that two layers of type C FEP each 0.002" thick bonded to 0.005" aluminum strip was invulnerable to concentrated HCl for three weeks, but finally showed slight permeation, all at atmospheric temperature and pressure. To obtain a nearly corrosion proof coating it is recommended that more than two layers of 0.002" be used, depending on the corrosive fluid being handled and the temperatures and pressures under which it operates. It has been found that aluminum strip 0.005 to 0.008" thickness, using one layer of 0.001" FEP type A each side, a material cost of approximately 32 cents per square foot, will make a ¾" I.D. tube with 40 lbs. working pressure at 350° F. This tube would be suitable for large scale use in low operation pressure sea-water distillation systems. This tube would cost about 25 to 30 cents per linear foot manufactured into a heat exchanger tube. If a highly corrosion resistant 90–10 copper-nickel thin sheet is used instead of aluminum, the cost per foot would increase about 10 cents to from about 35 to 40 cents per foot. The product is a composite tube which is deposit and scale resistant, corrosion resistant, fluorocarbon coated both sides with sufficient 1 mil coating to provide oil-wettability and dropwise condensation on the steam side, and with good thermal conductivity, which may be produced at a cost of about 40 cents per foot. Aluminum may be used, by proper arrangement and materials combination in heat exchangers. This is a market savings as compared with a ¾" I.D. 90–10 Cu-Ni tube at 47 cents per foot, uncoated and subject to scaling and fouling and not giving dropwise condensation on the steam side. It is much less expensive than a 47 cents a foot Cu-Ni tube coated inside and outside with Teflon at an added cost of $1.80 per linear foot running its total cost to $2.27 per foot. Since the heat exchanger tubing accounts for nearly half the total cost of a sea-water distillation plant, providing a much better tube at 35 cents per foot over 47 cents per foot would mean a reduction of approximately 25% of the initial cost of tubing and 11 or 12% of the total plant cost. A 30 cents per foot tube would save 36% of tube cost, and a 25 cent tube would save 47%. The novel methods depicted in this invention may be used to produce suitable aluminum tubes coated both sides with FEP for approximately 25 cents per linear foot, which tubing may be suitably used with sea-water, oil field brine, brackish waters, and Great Salt Lake Brines using methods disclosed in another patent application of the present applicant companion to this one.

A distinctive feature of the invention as set forth above is the use of reduced atmospheric pressure conditions accompanied by heat to soften and bond the plastic film. The reduced atmospheric pressure should be sufficient to remove substantially all the air from between the laminae and the heat should be sufficient to effect bonding of the laminae without the application of pressure. Some of the advantages of such treatment will now be set forth.

Outstanding Advantages of Preceding
Disclosure as to Phase A (1) The use of vacuum permits uniform and complete bonding without entrapment of air. When vacuum is not used, a rolling device or confinement device must be used, as shown by Du Pont Bulletins T–11A and T–13C. Laboratory tests have shown that rolling or confinement of the heat softened film seriously reduces its bonding strength. But even assuming the practitioners of this have a means of keeping that bond strength, the herein described method of bonding in a vacuum is simpler, involves less manipulation and fewer operations, and permits multiple application of individual films to both sides in a continuous process.

(2) The use of vacuum completely eliminates the problem of oxide films forming on the metal surface when heating metals such as iron, copper and their alloys. These oxides bond to the fluorocarbon and very readily release from the parent metal surface, giving virtually no bond of it to the fluorocarbon film. To overcome this obstacle, Du Pont recommends use of surface treated copper which, of course, involves another expensive step in the operation (see Bulletin T–13C).

(3) The economic advantages are great: No bonding cements or additives are required; less costly steps are sufficient to achieve multiple coating both sides; achievement of multiple side coatings both surfaces of a metal strip is accomplished in a continuous operation for hundreds of feet of continuous lengths; ability to bond minimum thickness of fluorocarbon film to minimum thickness metal sheet in a simpler and continuous manner, thereby saving the excess use of the expensive fluorocarbon polymer. Some of these are advantages over bonding fluorocarbon film to metal as done by others; the advantages over other means of coating metals with fluorocarbons such as spraying dispersed particles, heat annealing and repeating to achieve multiple coats, is astronomical, usually costing about 10% of such other processes. The present method can produce a plastic-metal laminate in which the metal is coated on both sides with plastic at a cost of 35 cents per square foot whereas the same metal with sprayed-on baked-on fluorocarbon polymer would cost $10.00 per square foot for both sides. The least expensive metal laminate with one coat of FEP on one side found was $1.00 per square foot in large quantities; for both sides the cost would be $2.00 per square foot. Applicant's method costs about 16% of this latter mentioned product, and about 4% of sprayed-on product.

PHASE B—DESCRIPTION OF INVENTION RELATING TO MAKING COMPOSITE TUBES FROM PLASTIC-METAL LAMINATES

What I refer to as Phase B relates to the formation of composite tubes or tubular articles from previously formed plastic-metal products or laminates and includes the improved method of forming such composite tubes, apparatus for carrying out the method, and the completed composite tube itself. The invention will be more readily understood by reference to FIGS. 12a to 20, inclusive.

This phase of the invention, as previously indicated, relates to the formation of composite tubes or tubular articles from plastic-metal laminates such as those described under Phase A supra, and comprises shaping such article into tubular form, leaving an exposed plastic seam portion and applying heat to bond the seam portion and complete the tube or tubular article. The plastic film is preferably a fluorocarbon polymer such as Teflon. The lamina is preferably passed through a conventional tube forming die to form the tube and is preferably pre-coated with a silicone lubricant to facilitate passage through the die. The invention will be more fully understood by specific reference to FIGS. 12a to 20 of the drawings.

FIGS. 12a and 12b show a schematic arrangement for converting FEP or fluorocarbon clad metal strip, into tubing, with the aid of heat but without employing any bonding adhesives other than the fluorocarbon coating itself; in all cases where the fluorocarbon film is bonded to the metal strip by heat prior to this step of forming into a tubular article or sleeve. FIGS. 12a and 12b show two methods of tube forming, each with its own possible advantages, although experimental work thus far would definitely favor the longitudinal seam method over the spiral lap seam method. The longitudinal seam tube required about 20% less flat material to make a tube of the same seam overlap area, which governs the strength of the seam, as compared to the spiral wrap tube. To make a ¾" I.D. tube, coated with plastic both inside and outside, a 3" wide strip of metal, coated both sides with plastic as shown in FIG. 13 where 43 depicts a metal strip, 42 shows plastic films, preferably FEP, on both sides, is used. Such a composite strip 53 of metal, coated on both sides with plastic, is pulled from roll 52 first, through silicone oil coating device 54 (not detailed because common in the art) to coat both surfaces of the composite strip with silicone oil lubricant for easier passage through shaping die and prevent sticking or binding to mandrels in heat seam bonding apparatus. To make a longitudinal overlap seam bonded tube, silicone coated composite strip 55 is pulled as into and through shaping die 56 (not shown in detail as it is known in the art) whence it leaves as an unbonded, overlap seam tube 57. It is then pulled through a heated die 58 with tolerance sufficiently restricted to slightly embed each overlapping edge into the softened plastic coated surface adjacent to it, thereby firmly bonding the two strips together and sealing the raw exposed edge of metal created when the plastic coated sheet is slit into strips of the required widths, in this case 3". The strip emerges as bonded tube 59 that can be produced continuously in lengths equal to the length of the roll of initial material 52.

A simple cross-section view is shown at 60, showing the bonded overlap seam which in this case is about ½" wide. Tensile tests of sections from a ¾" I.D. tube made of 0.005" soft aluminum with 1 layer 0.001" FEP film on each side showed the overlap ½" seam bond to be much stronger than the laminate itself. The tube wall itself failed at temperatures up to 400 F., instead of the bonded seam, when subjected to tensile strain. To make a spiral wrap tube (FIG. 12a) silicone coated plastic clad strip 61 is fed from the coating device 54 onto a mandrel in step 62 (not shown in detail because common in the art) and is heat bonded in step 63, removed from the mandrel at 64 and emerges as bonded spiral tube 65. Pre-coating the strip with silicone oil permits use of a wrap mandrel and heating of same, for otherwise it would bond to the mandrel. It has been discovered in this experimental work that, although silicone treatment of a prebonded fluorocarbon film on metal will prevent it from sticking to other metal even up to 600° F., it does not have any observable deleterious effect on bonding previously bonded to metal fluorocarbon films to themselves. This makes possible this very vital arrangement for using silicone oil coatings in the manner just described. This method is believed to be novel as this particular manner of using a stick prevention coating has not been found in the existing art. The prior art does teach the use of silicone coatings on mandrels to prevent sticking of wrapped, unbonded fluorocarbon film, having no pre-coating of the film with silicone oil. In making this tube, use of "prebonded" fluorocarbon-metal laminate is vitally important, since unbonded superimposed layers of fluorocarbon film and metal will not suitably bond when shaped into an overlapped seam tube or in a spirally over-lapped seam tube.

FIG. 13 shows a strip of metal 43 with fluorocarbon films 42, 42, preferably FEP, previously bonded to both sides, this one 3" wide, to produce a tube ¾" I.D. with fluorocarbon coating on both the inside and outside of the tube.

FIG. 14 shows a comparatively wide sheet of metal 43 with same size sheet of fluorocarbon film 42 previously bonded to it on one side with 1" wide strips of fluorocarbon 44 bonded to the other side with 5" spacing between strips. This composite sheet is slit, as shown in the center of the 1" strip at 47 and in the center of the bare space between the 1" strips at 48. This produces the composite strip depicted in FIG. 15, comprising a strip 43 of metal 3" wide with an equal layer of fluorocarbon bonded film 42 on one side, and a strip 44 of fluorocarbon bonded film ½" wide adjacent to edge of metal strip 43 on the other side. This strip may be passed through stages depicted in FIGS. 12a and 12b to produce a ¾" I.D. metal tube similar to those shown at 60 and 65 in FIGS. 12a and 12b with the fluorocarbon bonded film either on the inside or the outside of the tube, with exposed metal surface on the opposite side in each instance, this all governed by manner in which it is fed into the shaping die 56 or spiral wrapping operation in 62. Since this prebonded fluorocarbon coat will not readily bond to raw metal if silicone is present (which is needed to prevent sticking to the mandrels of other coated surfaces), the ½" strip 44 on the bare side is needed to effect a good seam bond and still permit use of the non-sticking agent, silicone.

FIG. 15 has been described in connection with FIG. 14.

FIG. 16 is a cross-sectional detail of the overlap seam and illustrates bonding of same and sealing of the exposed edge of raw metal where metal is coated on each side with prebonded fluorocarbon film to produce a composite tube completely coated with fluorocarbon inside and outside. The metal is 43, the fluorocarbon coat is indicated at 42 and the sealing of the metal edges is shown at 45.

FIG. 17 is a cross-section detail of a composite strip including an overlap seam 45 wherein a fluorocarbon film 42 is prebonded and completely covers one side of the metal strip 43. The composite strip also includes a prebonded strip 44 on the edge of the other exposed side of the metal strip 43, arranged to produce a tube completely coated with fluorocarbon on the inside and with no coating on the outside. The metal is depicted as 43, the full coat of fluorocarbon as 42, the strip of fluorocarbon as 44, and the seal on the inside edge of metal as 45, where strip 44 bonds to coat 42.

FIG. 18 shows a cross-sectional detail of an overlap seam and bonding where fluorocarbon film is prebonded completely covering one side of metal and is a prebonded strip on the edge of the other side of the metal, and arranged to produce a tube completely coated with fluorocarbon on the outside and no coating on the inside. The metal is depicted as 43, the complete coat of fluorocarbon as 42, the strip of fluorocarbon as 44, and the seal of edge of metal as 45, where strip 44 bonds to coat 42.

FIG. 19 shows a composite tube 52 made of Teflon FEP coated metal which may be coated with FEP on both sides or on the inside only or on the outside only. It may be modified to permit cement bonding to the interior of a hole in a tube sheet such as is used in heat exchangers. On each end of the tube a strip 51 of Teflon FEP C about one inch wide is wrapped in at least one layer with the etched side of the FEP on the outside. The strip 51 should be etched on one side and wide enough to more than equal the depth of the hole into which the tube is to be mounted. This FEP film is adhered to the tube by heating from 550° to 600° F. thus readily and securely bonding the strip 51 to the convex curve of the tube when wrapped around it. This provides an etched surface at each end of the tube which permits its cementing to the interior of a hole in a metal plate with use of a variety of suitable well known adhesives, such as epoxy resins. If the tube is to be used to condense steam on the outside or change the temperature of mineralized waters, it would not be desirable to have the tube coated with the etched side of FEP out throughout its length as the etching tends to make it water wettable and would defeat the purpose for which the fluorocarbon film is being used, causing it to fail to promote dropwise condensation of water or permit scale to form and cling if in contact with mineralized waters.

FIG. 20 shows an arrangement whereby additional fluorocarbon sealing of the tube seam may be effected, both inside and outside, if it is found that the seal of the edge as shown and described in connection with FIGS. 16, 17 and 18 is inadequate. Since it has been found that an uninhibited strip of FEP will bond when heated lengthwise either *flat* or on a surface or on a convex curved surface, strips of FEP 50 and 50' may be bonded to the FEP-metal composite tube 49 by either mashing the tube flat as shown, or if it is larger, mashing the seam side to flatness, placing the strip 50 and 50' on it in sequence with the FEP film resting on top of the seam joint each time, and heating and bonding. This strip procedure would be desirable, generally, when it is desired to have the tube absolutely corrosion resistant.

Outstanding Advantages of Novel Preceding Disclosure on Tubes as to Phase B (1) The economic advantages have already been pointed out in previous parts of this disclosure. They are enormous. In the first place, this provision of a comparatively inexpensive tube with a well bonded and permanent bond of fluorocarbon film inside and outside is unique. No such tube has been offered for use to this date. Tubes lined and coated with fluorocarbons by methods used to date are prohibitively expensive for the much needed use in sea-water distillation and the like. Coating the concave surfaces of tubes with fluorocarbon film has proved very cumbersome and expensive in larger tubes, requiring use of considerable applied pressure while heating and producing a weak bond with much trouble from air bubbles or blistering; and in smaller tubes such as 1" diameter or less, the thin films are virtually impossible to bond to the tube interior without air bubbles or blisters. Using my method of bonding the fluorocarbon film to the metal in a flat or convex curved shape as a sheet or strip, then fashioning it into a tube, using the fluorocarbon coat as the seam bonding medium, overcomes this problem of bonding such film to a concave surface, simply and economically without use of applied pressure or cementing additives to coat or cement additives to bond the pipe seam.

(2) This novel tube and method of making provides (again, no such tube is yet available on the market) a very thin wall tube with very thin films of expensive fluorocarbon which are fully adequate for many uses, particularly heat exchanger tubes in sea-water distillation plants. Use of very thin metal sheet, five to ten mils thick, permits use of alloy metals such as 90–10 Cu-Ni and aluminum brass at about one fifth the cost for metal as required by conventional heat exchanger tubes of the same material. The metal in my ¾" I.D. tube composed of 8 mil thick 90–10 Cu-Ni and 1 mil Teflon each side costs approximately 11 cents per foot of tube as compared to more than 40 cents per foot for a ¾" O.D. conventional tube of this material. The 1 mil coating of Teflon FEP film on each side and the cost of fabricating into a tube adds 25 to 30 cents per foot cost to the tube, making a total of 35 to 40 cents per foot for a Teflon coated and lined tube to compete with 47 cents per foot cost of ¾" finished, conventional tube with no coating of Teflon. To coat this latter tube inside and out with a porous, less desirable coat of Teflon costs an additional $1.80 per foot which is prohibitive for most uses.

(3) Another novel and important advantage is discovery that fluorocarbon-metal laminate can be coated with silicone type oil and still be bonded to itself without impairment of the bond, and still provide the vital function of lubrication in the shaping step and prevention of sticking in the heat bonding of the same step.

(4) Still another advantage in this disclosure is the unique means and method of getting a good seam bond on the tube no matter whether the tube is coated both inside and outside, or, singly, on either side with fluorocarbon film. There are instances where it is desired to have the fluorocarbon on the inside only, on the outside only, and on both sides; my method provides this variety.

PHASE C—DESCRIPTIVE OF LINING PIPE OR VESSEL WITH PLASTIC CLAD METAL SLEEVE

This phase (C) of the invention is illustrated in FIGS. 21–25 inclusive, and more particularly this phase of the invention relates to the method of lining the interior surface of a pipe or vessel with a sealed seam sleeve or tube consisting of a previously bonded laminate of plastic film to metal sheet comprising the steps of rendering the interior surface of the pipe or vessel cementable; placing inside the pipe or vessel a liner or tube whose exterior area is approximately the same in dimensional area as the pipe or vessel interior area and which is coated inside with a previously bonded film of plastic and whose exterior is either a cementable metal surface or cementable previously bonded plastic film; impregnating the interior of the pipe or vessel and the exterior of the liner tube or sleeve with a coating of cementing material; exhausting substantially all gases from both the interior and exterior of the liner to effect subatmospheric pressure; compressing the liner to the inner surface of the pipe or vessel by applying atmospheric or greater pressure to the interior of the liner; bonding the liner to the pipe or vessel interior by the setting or curing of the cementing material, with or without the application of heat. The cementing material is preferably applied as a liquid or dispersed liquid in a gas during the impregnating step and is circulated through a closed system.

The plastic film is preferably a fluorocarbon polymer such as FEP Teflon or the like and may be a tetrafluoroethylene polymer or copolymer or a hexafluoropropylene-tetrafluoroethylene polymer or copolymer.

The invention also comprises the method of lining the interior surface of a pipe or vessel with a sealed seam sleeve or tube consisting of a previously bonded laminate of a plastic film to a metal sheet; said method comprising the steps of cleansing the interior surface of the pipe or vessel; placing inside the pipe or vessel a liner, tube or sleeve whose exterior area is approximately the same dimensional area as the pipe or vessel interior area and which is coated inside and outside with a previously bonded plastic film; creating subatmospheric pressure conditions by exhausting substantially all gases from both the interior and exterior of the liner, tube or sleeve; compressing the liner to the inner surface of the pipe or vessel by applying atmospheric or greater pressure and the bonding of the two with application of suitable heat for a suitable length of time. The liner tube or sleeve is preferably fluted by any suitable means. The invention will be more fully described by reference to the drawings.

FIG. 21 shows a schematic arrangement whereby a pliable, composite tube of fluorocarbon clad metal 59 is pulled through a conventional shaping die 66 to form a fluted tube 67. The metal may be coated either inside only or both inside and outside with the fluorocarbon polymer. Since this tube is preferably fluted to facilitate its use as a liner for a pipe or vessel, its O.D., before fluting, should be substantially the same as the I.D. of the pipe being lined. When it is fluted, its O.D. will be considerably reduced permitting easy entrance into the pipe to be lined.

FIGS. 22 and 23 show a means and method of bonding a fluted, fluorocarbon-metal laminate sleeve or tube such as shown in FIG. 21 to the interior of a pipe or cylindrical vessel using only a cementing agent to bond, or using it in combination with heat, or using heat only, all with at least sufficient pressure to uniformly contact the sleeve with the pipe interior. The fluted sleeve 67 can be coated inside and outside with heat prebonded fluorocarbon or it may be coated on the inside only since its purpose is to provide a fluorocarbon lining for a pipe or vessel. If it is coated on both sides, it may be heat bonded without use of cement additives to the pipe interior. If it is coated on both sides with the outside coat having an etched side on its exterior, then it may be cement bonded to a pipe interior. If it is not coated at all on the outside, it may be cement bonded to the pipe interior provided that the metal surface is prepared for such bonding which may be accomplished in various well known and conventional manners. Among the several possible procedures are the following:

(a) Using a cementing agent together with heat and pressure

The fluted tube 67, with the outside surface either coated with etched side out Teflon FEP C or with no coating, but with the metal surface prepared for cementing, is inserted in the pipe 68 to be lined. Mandrel housings 70 and 73 provided with sealing O-rings 74 are attached to each end of pipe with sufficient set screws 72. A tapered mandrel 69 with hollow stem 71 and air passageway hole 82 is forced into one end of the fluted sleeve or tube 67 just sufficiently to engage it without distorting it. This may be accomplished by turning a screw wheel 77, or the mandrel may be inserted in the end of the fluted sleeve when the housing 70 is placed on the pipe. A tapered mandrel 74' at the other end of the tube 67 is similar to the mandrel 69 except that it has no hollow in its stem or air outlet hole 82. It may be provided with the same type of housing and moving arrangement as does mandrel 69, which is not shown completely on the drawing since it is preferably a duplicate of 70. Mandrel 74' is inserted into fluted sleeve 67 as was mandrel 69. Air under pressure is injected from flexible pipe source 79 through valve 80 through connection 78 through hollow passageway 81 of stem 71 into interior of mandrel 69. The air passes through outlet hole 82 into the interior of the fluted sleeve where its only escape route is through the fluted space between mandrels 69–74' and sleeve 67 at 83 and 86. The air then enters the interior of mandrel housings 70 and 73, where it mixes with an incoming stream of cementing fluid. The incoming air is designated throughout by an arrow with a single spear. This cementing fluid may be an epoxy resin cement diluted ten to one with methyl-ethyl-ketone or a mist of this cement atomized with air. This cementing fluid is introduced into housing 70 through valve 100 at opening 101. The air arrangement through hollow stem 71 and mandrel outlet hole 82 is for two purposes: (1) to maintain sufficient pressure inside the fluted sleeve 67 over that in mandrel housings 70 and 73 to prevent the passage of any of the cementing fluid to the interior of fluted sleeve 67, and (2) to act as a purging means to drive solvent from cement wet pipe interior and fluted sleeve exterior after it is properly coated with cementing material.

The air from hole 82 and the interior of sleeve 67 mixes with the cementing fluid in mandrel housings 70 and 73 and passes out with it through exit hole 88 of housing 73. The cementing fluid is depicted by arrows with two barbs, and passes from mandrel housing 70 through the fluted spaces between pipe 68 and fluted sleeve 67 at 84 and out at 85. The mixed air and cementing fluid leave housing 73 through conduit 89, valve 89' and conduit 90 into cement-air separator 91 (not shown in detail as common in the art). The air leaves the separator 91 through conduit 93 leading to atmosphere and air pump 94 which repressures the air, which then passes through conduit 95 where it enters jet atomizer 98. The thin liquid cement leaves the separator 91 through conduit 92 and is enriched by more cement makeup entering the conduit 91 from container 96 through side conduit 97. This mixture is drawn into an atomizer 98 and re-mixed with air, and moves thence through conduit 99 back to valve 100 to repeat its cycle. This method of applying cement to the interior of the pipe and exterior of the fluted sleeve minimizes waste of cementing material and facilitates what would otherwise be a sticky and cumbersome operation. The improved method eliminates spraying, dipping or brushing. Tests indicated that a 10–1 M-E-K diluted epoxy cement does a good job of cementing when heated to 300° F. for an hour. After the interior of pipe 68 and exterior of fluted liner 67 are coated with sufficient cement and the solvent driven off as previously described by circulating air, only, throughout the system the whole interior is subjected to vacuum by exhausting air from opening 102 in mandrel housing 70 through valve 103 to source of vacuum 104. Next, mandrels 69 and 74 may be forced into the fluted sleeve 67 by turning screw wheel 77 on each mandrel housing, firmly pressing each end of the fluted sleeve to the pipe interior. Next, atmospheric pressure is admitted to interior of fluted sleeve, flattening the flutes and firmly pressing it to the interior of the pipe with no possible entrapment of air between the sleeve and the pipe as it was all exhausted by vacuum. Next air is admitted to the interiors of both mandrel housings 70 and 73 by opening valves 89' and 100'. In order to utilize the more intricate mandrel housings 70 and 73 to the fullest, they may then be replaced by mandrel plugs 105 and 106 as shown in FIG. 23, held firmly into the sleeve pipe by tie rods 114 and strips 112 and 113 as shown in FIGS. 23 and 25. This permits addition of air under pressure through valve 108 (FIG. 23), opening 109 and outlet 110 in mandrel plug 105 into the interior of composite pipe 68 containing the sleeve 67. The proper pressure is governed by conditions peculiar to the size of pipe and other variables and may be determined by those skilled in the art. In some cases atmospheric pressure may prove sufficient. The pipe 68 with its cemented liner or sleeve 67 pressed firmly against its interior with its mandrels 105 and 106 is then placed in an oven 115 and heated to bonding temperature of the particular cement for a length of time suited to that particular temperature. With epoxy resin cement the time should be about one hour at not over 300° F.

(b) Using cementing agent and pressure only

Repeat steps of (a) omitting the final step of heating, but allowing more time for the cement to bond and cure, to be determined by trial and error. With epoxy cement at least 24 hours will be required.

(c) Using cementing agent with heat only atmospheric pressure against cemented liner Repeat steps of (a), omitting final steps of using mandrel plugs 105 and 106, but heating in oven 115 for required time and temperature to obtain good bonding.

(d) Using cementing agent only

Carry out the process as set forth under (c) supra, but omitting the final heating step.

(e) Use of no cement, bonding with heat and pressure only

The fluted sleeve 67 must have an exterior and an interior coating of fluorocarbon. Repeat the steps of (a) supra, but omitting the first steps of impregnating with cement, then use the same procedure including heating in an oven, using sufficient pressure and temperature and time to secure a good bond of fluorocarbon (preferably Teflon FEP) between sleeve and pipe interior. Using FEP the bonding temperature should preferably be between about 575° to 625° F. for at least ten minutes after the pipe and sleeve have reached the bonding temperature. The required pressure should be from about 50 to 200 lbs. per square inch, the exact pressure to be determined by trial and error in a particular case.

(f) In some instances heat and atmospheric pressure only may be sufficient for bonding FEP coated liner to pipe interior where vacuum is used as in all the preceding steps described. This, too, may be determined by trial and error.

Outstanding Advantages of Preceding Novel Disclosure (1) Utilizes novel observation that, whereas, fluorocarbon films such as heat bondable FEP are very difficult to bond to concave surfaces, generally requiring considerable application of pressure during the heat bonding process, previously bonded fluorocarbon film to metal bonds quite readily to concave surfaces with application of minimum pressure or even mere contacting of the laminate to the metal surface during the heat to softening temperature of the plastic. This novel approach provides an economical, simple means of coating the interior concave surface of a pipe or vessel with a fluorocarbon film as a laminate with or without cementing.

(2) Use of vacuum between the laminate and the pipe or vessel interior assures uniform and complete contact with no entrapment of air or gases.

(3) Novel apparatus for use of vacuum also utilizes vacuum for immediate and simple application of pressure to the interior of the laminate sleeve or liner to firmly contact it to the pipe or vessel interior.

(4) Novel apparatus and method for circulating thinned cement or gas dispersed cement mist to the surfaces to be cemented is convenient, economical in preventing waste of cementing material, and time saving.

(5) Fluting of the liner prior to insertion is made possible by use of stiffened laminate (as contrasted to pure fluorocarbon thin liners which cannot be shaped by bending), this fluting being very beneficial to give proper positioning of the liner in the pipe or vessel, better access for uniform coating with cement, facilitate removal of air with vacuum, and assure uniform conformation of the liner to the pipe interior when pressure is applied.

The invention has been described in detail for the purpose of illustration but it will be obvious that modifications and variations may be resorted to without departing from the spirit of the invention in its broadest aspects as will be apparent to those skilled in the art.

For example while I have found the invention particularly applicable to heat bonding fluorocarbon polymer plastic films to metal films to form a plastic-metal laminate the invention in its broadest aspects is applicable to the bonding of other plastic polymer films to metal sheets or films. Also while I have found silicone oils to be particularly effective as non-sticking agents or lubricants in connection with certain phases of my invention heretofore described other non-sticking agents or lubricants may be used within the scope of my invention in its broadest aspects. Also where reference is made in the specification to "feet" it will be understood that linear feet are intended unless otherwise specified.

What is claimed is:

1. The method of forming a composite fluorocarbon-metal tube which comprises shaping into an article of tubular form a lubricated strip of previously bonded fluorocarbon plastic-metal laminate formed by heat bonding a fluorocarbon plastic to a metal strip without the use of bonding additives, said tubular article including:
    (1) an unbonded, overlapping seam portion of laminate with opposing fluorocarbon plastic surfaces,
    (2) exposed surfaces of fluorocarbon plastic subject to contact with unlike surfaces of molds, dies or mandrels,
    (3) a coating of silicone lubricant material applied to both sides of the laminate strip prior to shaping, such material functioning both as a lubricant for the shaping step and as a means of preventing adherence of the tubular article to any unlike contacting surfaces during a subsequent heating and bonding step, while permitting uninhibited heat bonding of the seam surfaces, then, after the aforementioned shaping of the tubular article, applying heat and firm contact to the unbonded seam to effect full bonding of same without adherence of any finished tube surface to other contacting surfaces.

2. The method according to claim 1 wherein the laminate is shaped to tubular form by passing through a conventional tube-forming die.

3. The method according to claim 2 wherein the laminate is a fluorocarbon-metal laminate and is previously coated on both sides with a silicone type oil to facilitate its passage through a tube forming die and prevent bonding of this tube to a subsequent heated seam bonding die and mandrel; and wherein the silicone coating does not interfere with the bonding of the two previously metal bonded fluorocarbon surfaces.

4. The method according to claim 1 wherein the tubular article is coated with fluorocarbon film on both the inside and outside, being fabricated from a laminate strip with a full coating of previously bonded fluorocarbon on each side of a metal core.

5. The method according to claim 1 wherein the tubular article is coated with fluorocarbon film on the inside, only, being fabricated from a laminate strip with previously bonded full fluorocarbon coat on one side and a narrow margin strip of previously bonded fluorocarbon on the other side of a metal core, said narrow strip of fluorocarbon acting as a bonding agent to the edge of the fully coated side.

6. The method according to claim 1 wherein the tube is coated with fluorocarbon film on the outside, only, and is fabricated from a laminate strip with previously bonded full fluorocarbon coat on one side and a narrow margin strip of previously bonded fluorocarbon on the other side of a metal core, said narrow strip of fluorocarbon acting as a bonding agent to the edge of the fully coated side.

7. The method according to claim 1 wherein both inside and outside exposed metal edges of a metal core of the laminate, formed into a tube by bonding overlapping edges, are sealed over with fluorocarbon by slight embedding of each edge into the heat softened fluorocarbon surface adjacent to it which is effected by passage through a close tolerance heated die.

8. The method according to claim 1 wherein the tubular article includes a metal core having an inside exposed metal edge, and wherein the inside exposed metal edge of the metal core of the laminate, formed into a tubular form by bonding overlapping edges, is sealed over the fluorocarbon by slight embedding of the edge into the heat softened fluorocarbon surface adjacent to it, this being effected by passage through a close tolerance heated die.

9. The method according to claim 1 wherein the tubular article comprises a metal core having an outside exposed metal edge and wherein the outside exposed metal edge of the metal core of the laminate, formed into tubular form by bonding overlapping edges, is sealed over with fluorocarbon by slight embedding of the edge into the heat softened fluorocarbon surface adjacent to it, this being effected by passage through a close tolerance heated die.

10. The method according to claim 1 wherein the laminate is fed as a strip into a tube forming mechanism producing a tubular article with an unbonded, longitudinal, overlapping seam, then passing the tubular article through a heated die to firmly bond the seam by softening and welding two fluorocarbon surfaces together, producing a finished tube.

11. The method according to claim 1 wherein the laminate is fed as a strip into a tube forming mechanism producing a spirally wrapped tube about a mandrel, with an unbonded, spiral, overlapping seam to produce a tubular article, then passing the tubular article through a heating zone which softens and welds the two contacting surfaces of fluorocarbon on the overlapping seam; the article being removed from the mandrel as a finished tube.

12. The method according to claim 8 wherein the laminate is in strip form and is coated with a silicone type oil prior to shaping into a tubular shape.

13. The method according to claim 11 wherein the laminate strip is coated with a silicone type oil prior to wrapping about a mandrel.

14. The method according to claim 1 wherein the previously bonded fluorocarbon plastic-metal laminate is prepared by heat bonding a plastic film of fluorocarbon to a metal strip in an environment of reduced pressure without application of pressure to the outer surface of the plastic film and without use of bonding additives.

15. The method according to claim 1 wherein the lubricant material is a silicone oil.

16. The method according to claim 1 wherein the plastic material comprises a tetrafluoroethylene polymer.

17. The method according to claim 1 wherein the plastic material comprises hexafluoropropylenetetrafluoroethylene.

References Cited

UNITED STATES PATENTS

| | | | |
|---|---|---|---|
| 3,673,054 | 6/1972 | Wright et al. | 156—272 |
| 3,660,194 | 5/1972 | Hoffmann et al. | 156—218 |
| 3,700,524 | 10/1972 | Sato | 156—218 |
| 3,268,620 | 8/1966 | Tarwid | 113—120 A |
| 3,360,157 | 12/1967 | Bolt et al. | 113—120 A |
| 3,090,717 | 5/1963 | Raczynski et al. | 156—272 |
| 3,551,232 | 12/1970 | Thompson | 156—286 |
| 3,148,896 | 9/1964 | Chu | 285—55 |
| 3,411,542 | 12/1968 | Walsh et al. | 156—218 |
| 3,452,133 | 6/1969 | Bratton et al. | 156—85 |

CHARLES E. VAN HORN, Primary Examiner

F. FRISENDA, JR., Assistant Examiner

U.S. Cl. X.R.

156—242, 278, 289, 304